(12) United States Patent
Shih et al.

(10) Patent No.: US 10,400,759 B2
(45) Date of Patent: Sep. 3, 2019

(54) FLOW SENSORS WITH MODULAR MICROFLUIDIC CHANNELS AND METHODS OF MANUFACTURE

(71) Applicants: Jason Shih, Yorba Linda, CA (US); Jiangang Du, Pasadena, CA (US); Blake W. Axelrod, Sierra Madre, CA (US); Changlin Pang, Pasadena, CA (US)

(72) Inventors: Jason Shih, Yorba Linda, CA (US); Jiangang Du, Pasadena, CA (US); Blake W. Axelrod, Sierra Madre, CA (US); Changlin Pang, Pasadena, CA (US)

(73) Assignee: MINIPUMPS, LLC, Pasadena, CA (US)

( * ) Notice: Subject to any disclaimer, the term of this patent is extended or adjusted under 35 U.S.C. 154(b) by 673 days.

(21) Appl. No.: 14/258,763

(22) Filed: Apr. 22, 2014

(65) Prior Publication Data

US 2014/0311912 A1    Oct. 23, 2014

Related U.S. Application Data

(60) Provisional application No. 61/814,645, filed on Apr. 22, 2013, provisional application No. 61/898,681, filed on Nov. 1, 2013.

(51) Int. Cl.
*F04B 49/02* (2006.01)
*G01F 1/684* (2006.01)
*G01F 1/692* (2006.01)

(52) U.S. Cl.
CPC .......... *F04B 49/022* (2013.01); *G01F 1/6845* (2013.01); *G01F 1/692* (2013.01); *Y10T 29/4913* (2015.01)

(58) Field of Classification Search
CPC .......... G01F 1/692; G01F 1/6845; G01F 1/69; F04B 49/022; B01L 9/52; B01L 9/527; B01L 3/5027; B01L 3/502707; B01L 3/502715; B01L 3/50723; B01L 3/502746; B01L 2200/0652; B01L 2200/0684;

(Continued)

(56) References Cited

U.S. PATENT DOCUMENTS 4,548,078 A    10/1985  Bohrer et al.
6,635,226 B1 *  10/2003  Tso .................. B01L 3/5027
                                                       422/129

(Continued)

FOREIGN PATENT DOCUMENTS

EP    2040045 A2    3/2009

OTHER PUBLICATIONS

Kontakis et al. (Microelectronic Engineering, 2009, 1382-1384).*

(Continued)

*Primary Examiner* — Gurpreet Kaur
(74) *Attorney, Agent, or Firm* — Morgan, Lewis & Bockius LLP

(57) ABSTRACT

Modular microfluidic channel structures for conducting liquid from a reservoir include a sensor for monitoring a parameter (such as flow rate or pressure) relating to liquid flowing therethrough. The microfluidic channel generally comprises a thermally insulating substrate made of one or more materials such as, e.g., glass, fused silica, parylene, and/or silicone.

8 Claims, 9 Drawing Sheets

(58) Field of Classification Search
CPC ....... B01L 2200/0668; Y10T 29/49002; Y10T 29/49155; Y10T 29/49114; Y10T 29/49128; Y10T 29/4921; Y10T 29/49126; Y10T 29/49794
See application file for complete search history.

(56) References Cited

U.S. PATENT DOCUMENTS

| | | | |
|---|---|---|---|
| 7,233,000 B2 * | 6/2007 | Nassiopoulou | B81C 1/00071 250/338.4 |
| 7,666,285 B1 * | 2/2010 | Cho | B01L 3/502715 137/814 |
| 2005/0022594 A1 | 2/2005 | Padmanabhan et al. | |
| 2008/0044939 A1 | 2/2008 | Nassiopoulou et al. | |
| 2009/0173166 A1 | 7/2009 | Genosar | |
| 2009/0306585 A1 * | 12/2009 | Pang | A61M 5/14276 604/67 |
| 2014/0326064 A1 * | 11/2014 | Nakano | G01F 1/6842 73/204.26 |

OTHER PUBLICATIONS

Noh et al. (Sensors and Actuators, 2004, 78-85).*
Chen et al. (IEEE, Nano/Micro Engineered and Molecular Systems, 2007, 826).*
Communication Pursuant to Article 94(3) EPC, Application No. 14 732 664.9-1020, Jan. 31, 2018, 9 pages.

* cited by examiner

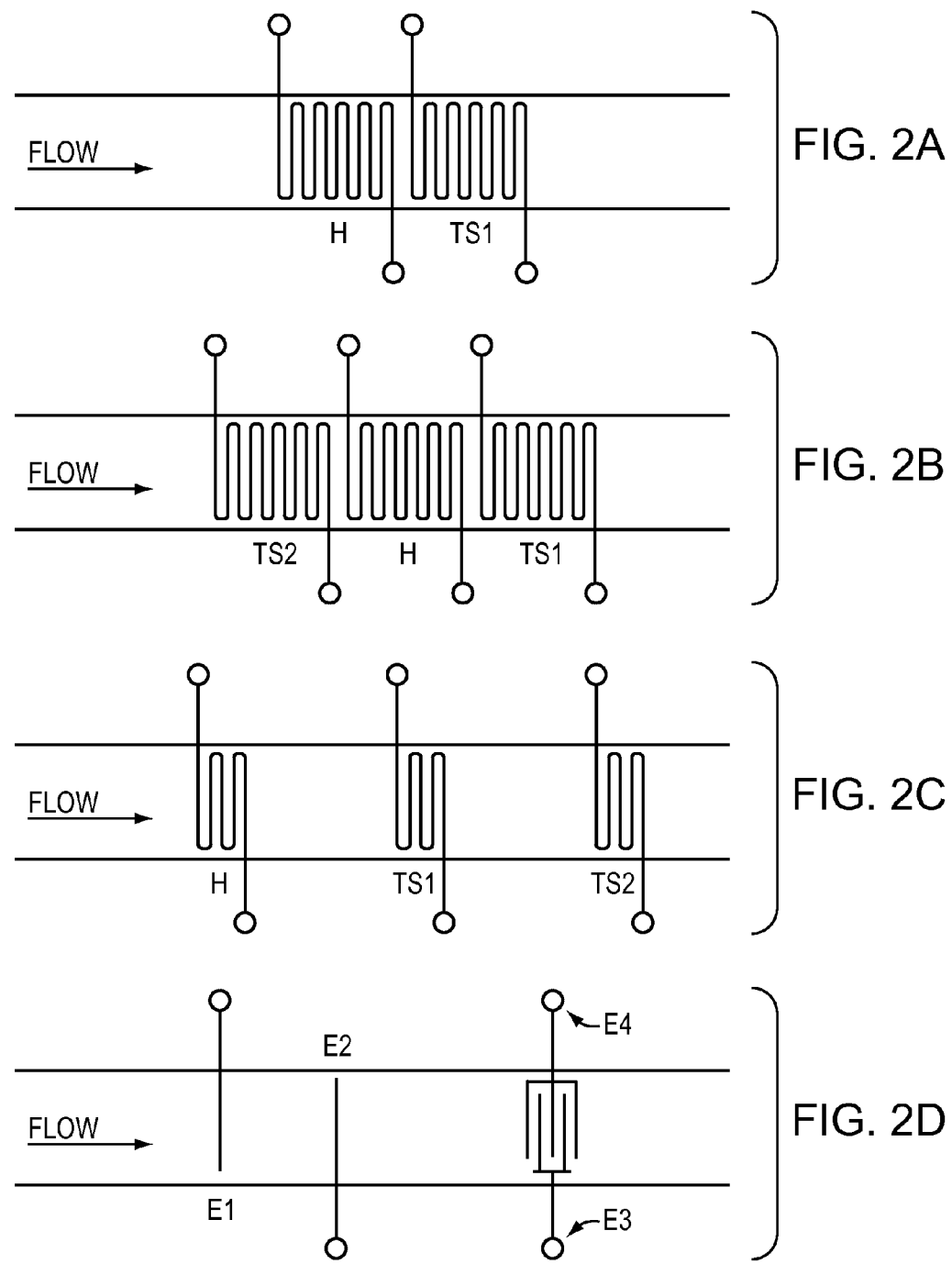

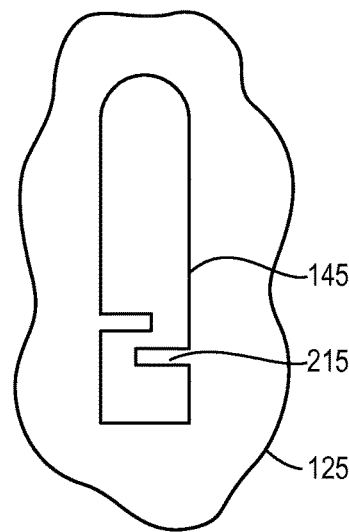
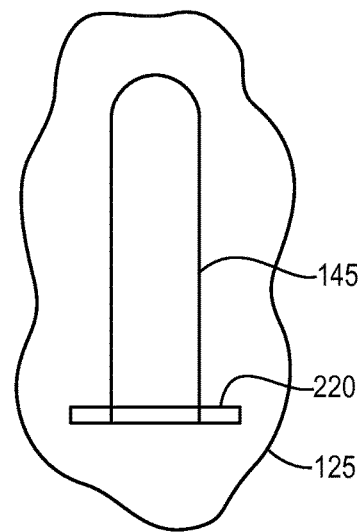
FIG. 5A  FIG. 5B
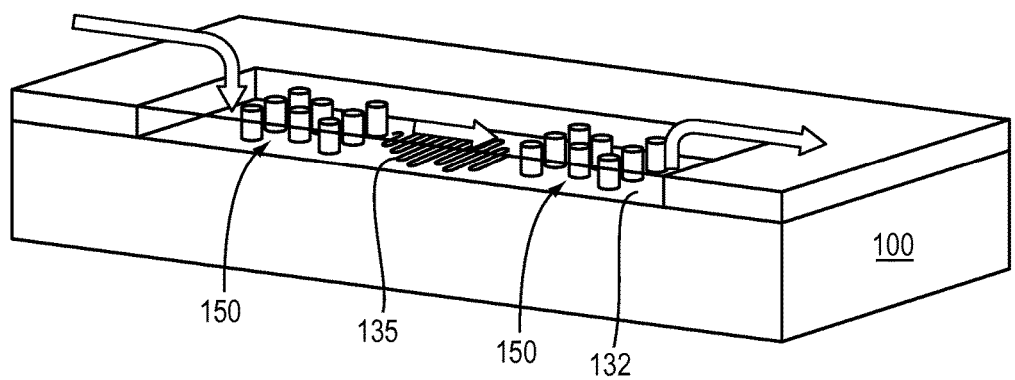
FIG. 6

FLOW SENSORS WITH MODULAR MICROFLUIDIC CHANNELS AND METHODS OF MANUFACTURE

CROSS-REFERENCE TO RELATED APPLICATION

This application claims priority to and the benefit of, and incorporates herein by reference in their entireties, U.S. Ser. Nos. 61/814,645 (filed on Apr. 22, 2013) and 61/898,681 (filed on Nov. 1, 2013), the entire disclosures of which are hereby incorporated by reference.

TECHNICAL FIELD

The present invention relates to microfluidic channels and methods for their manufacture, and more particularly to channels suitable for microfluidic devices such as small, implantable drug-delivery devices.

BACKGROUND

The need for ever-smaller pumping devices, particularly in the medical field, continues to grow. As a result, the need for increasingly small operational pump components, such as cannulas with integrated flow sensors, is growing as well, challenging the limits of conventional manufacturing processes.

Monitoring and controlling the administration of a drug is critical in any situation. It is particularly crucial in an implanted drug pump, which physicians often cannot closely monitor. The pump must therefore contain sufficient autonomous safeguards to ensure proper dosing and monitoring of the pump's condition and performance. Furthermore, the reservoir of drug is likely to be of limited size and its contents must be monitored to ensure timely refilling or replacement.

Conventional flow-sensor material choices and structural configurations cannot readily be deployed at sufficiently small footprints while accurately measuring low flow rates for many years of implantation, maintaining robust functionality within small implantable devices. Accordingly, there is a need for reliable, biocompatible, and readily manufacturable performing micro-scale check valves and methods for their reproducible manufacture.

SUMMARY

In various embodiments, the present invention comprises a flow sensor with a microfluidic channel for measuring the volumetric flow rate of, for example, a drug dispensed by an implanted drug pump. The sensor may drive closed-loop feedback that regulates dispensing. Measuring the volumetric flow rate in real time enables adjustment of the drug pumping power to maintain a constant volumetric flow rate, as well as to terminate pumping of the drug when the proper dose has been administered. Flow sensors in accordance herewith accurately measure flow rates less than 100 µL/min. In some embodiments, the flow rate is accurately measured below 20 µL/min. In other embodiments, the flow rate is accurately measured below 2 µL/min. These low and ultra-low flow-rate accuracies are necessary in many implantable drug-delivery devices, which usually contain formulations of highly concentrated and potent drugs capable of causing adverse events in cases of excessive or insufficient delivery.

As it may serve as a component in an implanted drug pump, the flow sensor is configured to operate robustly for extended periods of time—as long as 10 years—while exposed to water and the elevated temperature and salinity of the human body. These conditions have corrosive and degrading effects on typical electronic and micro-electro-mechanical systems (MEMS) components. Embodiments of the present invention reflect material choices and methods of manufacture that address the harsh implant conditions. For example, fused silica is a suitable substrate material because of its high purity, high strength and low thermal conductivity. Amorphous silicon carbide is a good dielectric material due to its high thermal conductivity, high strength, durability and chemical inertness.

In various embodiments, the present invention provides multifunctional modular microfluidic sensor channels for implanted drug-delivery pumps. Cannulas, which may be received within complementary pockets of the channel, can themselves include one or more integrated functional components, e.g., a flow sensor, pressure sensor, check valve, filters, etc. The modular nature of the microfluidic channel allows for their convenient incorporation into other microfluidic channels and allow for redundancies if necessary.

Embodiments of the invention feature a modular microfluidic channel for conducting liquid from a reservoir, and a sensor for monitoring a parameter (such as flow rate or pressure) relating to liquid flowing through the cannula. The sensor may be electrically connected to control circuitry via contact pads connected to metal lines running into the microfluidic channel. The microfluidic channel generally comprises a thermally insulating substrate made of one or more materials such as, e.g., glass, fused silica, parylene, and/or silicone.

Accordingly, in one aspect, the invention pertains to a microfluidic flow channel. In various embodiments, the flow channel comprises an electrically and thermally insulating substrate; on the substrate, circuit components including at least one sensor element, at least two resistive elements electrically connected thereto and at least two contact pads each electrically connected to one of the resistive elements, where the sensor element(s) are disposed within a channel region of the substrate; disposed on the circuit components, a dielectric layer; and disposed on the substrate, at least one layer defining (i) a well over the channel region of the substrate, (ii) at least two apertures overlying the channel region, and (iii) a pair of receiving pockets each configured for receiving a fluid conduit therein. The receiving pockets are each configured for receiving a fluid conduit therein, and fluidically communicate with the channel region but not directly with each other.

In some embodiments, the well is defined by (i) a first parylene layer having an opening therethrough coextensive with, and defining a vertical dimension of, the channel region, and (ii) a second parylene layer in contact with the first parylene layer, where the second parylene layer contains the apertures. The the receiving pockets may, for example, be formed in a cover in contact with the second parylene layer. In other embodiments, the the well, the apertures and the pockets are formed within a cover comprising a single block of silicone. In one particular embodiment, the cover is parylene, the dielectric layer is amorphous silicon carbide and the substrate is fused silica. In another particular embodiment, the cover is silicone, the dielectric layer is amorphous silicon carbide and the substrate is fused silica. In a representative configuration the dielectric layer has a thickness in the range of about 10 µm to about 100 µm and the opening has a longest dimension in the range of 50 µm to 1 mm.

Typically, the the contact pads are fluidically isolated from the channel region. One or more of the sensor elements may be a thermal flow sensor. Alternatively or in addition, one or more of the sensor elements may be a time-of-flight sensor. In some embodiments, the flow channel includes a plurality of spaced-apart posts within the channel region for trapping debris.

In another aspect, the invention pertains to a method of fabricating a microfluidic sensor. In various embodiments, the method comprises the steps of providing an electrically and thermally insulating substrate; applying, to the substrate, circuit components including at least one sensor element, at least two resistive elements electrically connected thereto and at least two contact pads each electrically connected to one of the resistive elements; and fabricating, onto the substrate, a structure including (i) a fluid channel over the at least one resistive element but fluidically isolated from the at least two contact pads, and (ii) a cover comprising a pair of receiving pockets each fluidically communicating with the channel but not directly with each other.

In some embodiments, the method further comprises the step of inserting inlet and outlet tubes into the receiving pockets. In embodiments where the structure is made of silicone, the method may further comprise the step of sealing, with silicone, the ends of the fluid channel where the tubes are inserted. In embodiments where the structure is made of parylene, the method may further comprise the step of anchoring at least a portion of the structure to the substrate with a plurality of mechanical anchors. For example, the fabricating step may comprise (i) etching wells into the substrate beneath the dielectric layer, and (ii) causing the wells to fill as the intermediate layer is applied, thereby anchoring the intermediate layer to the substrate. The cover may attached to the intermediate layer with an adhesive and the receiving pockets comprise extensions forming catch-wells to trap stray adhesive.

The structure may comprise a polymeric layer having an opening therein defining the channel, and an intermediate layer between the polymeric layer and the cover. The intermediate layer may include at least one opening within each of the receiving pockets permitting fluid communication between the pocket and the fluid channel. The opening may be through the intermediate layer or between the pocket and a recess between the pockets, where the recess forms the walls (i.e., the vertical dimension) and ceiling of the channel. In some embodiments, the method further comprises the step of introducing a plurality of filter posts within the channel.

In some embodiments, an electrochemical process is used to screen for defects.

As used herein, the term "substantially" or "approximately" means ±10% (e.g., by weight or by volume), and in some embodiments, ±5%. The term "consists essentially of" means excluding other materials that contribute to function, unless otherwise defined herein. Nonetheless, such other materials may be present, collectively or individually, in trace amounts.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention, in particular, when taken conjunction with the drawings, in which:

FIGS. 2A-2D schematically illustrate flow sensors suitable for use in embodiments of the invention;

FIGS. 5A and 5B are plan views of pocket structures containing side chambers and/or fences to control adhesive wicking;

FIG. 6 schematically illustrates a filter structure within the fluid channel of an embodiment of the invention.

DETAILED DESCRIPTION

1. Basic Structure and Operation

Figure 1A:
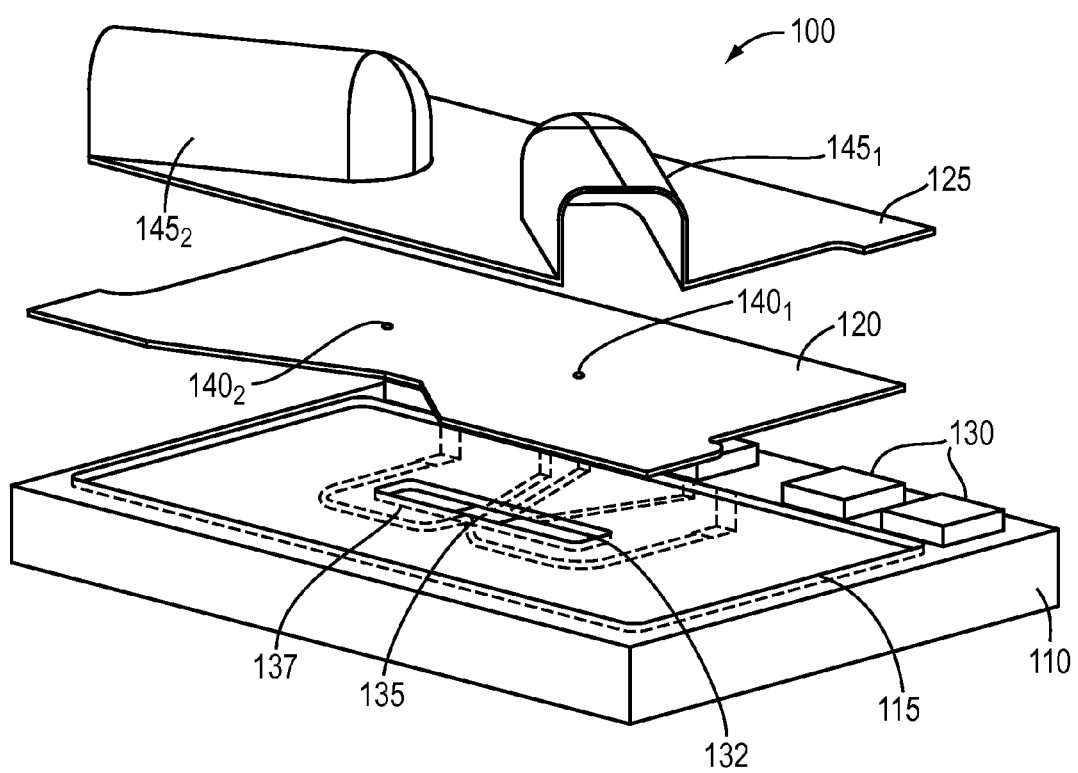
FIGS. 1A, 1B and 1C are partially exploded, perspective and plan views, respectively, of a basic flow-sensor structure in accordance with one embodiment.
Figure 1B:
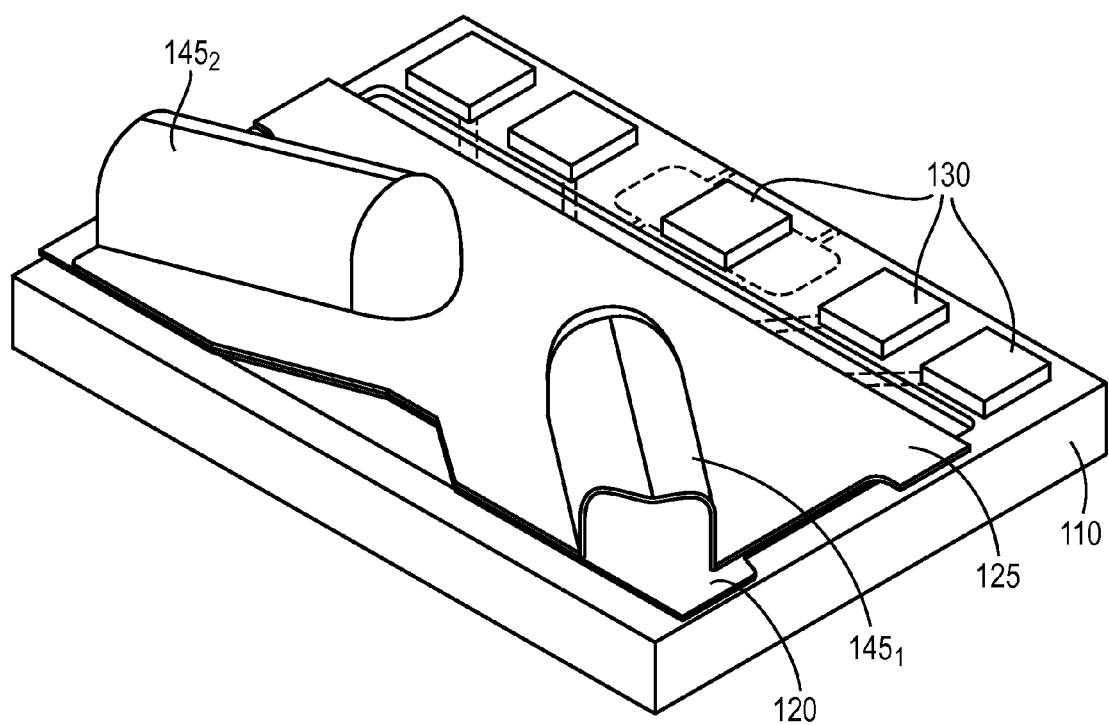
Figure 1C:
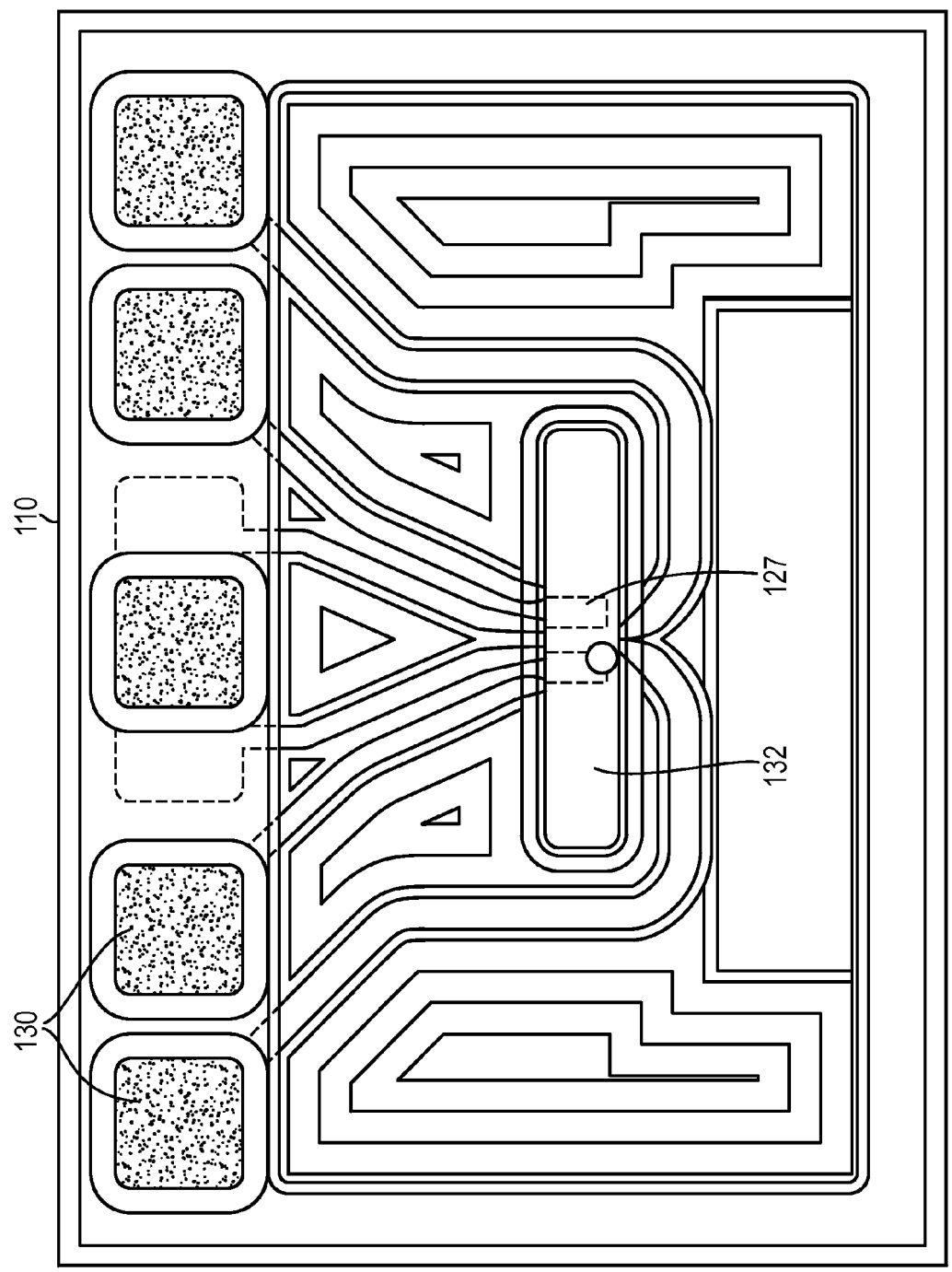

Refer first to FIGS. 1A-1C, which illustrate a flow sensor 100 with a microfluidic channel in accordance herewith. The flow sensor 100 includes a substrate 110, a biocompatible polymer (e.g., parylene) layer 115, a dielectric layer 118 (see FIG. 4), an intermediate layer 120, and a cover 125. As best seen in FIG. 1C, which illustrates the surface of substrate 110, the substrate includes a series of surface resistor elements representatively indicated at 127. The resistor elements 127 are electrically connected to a plurality of contact pads 130, which facilitate electrical connection to the flow sensor 100. The resistors 127 and contact pads 130 may all be plated or otherwise deposited (e.g., by thermal or electron-beam evaporation, or by any other suitable deposition technique) onto the surface of substrate 110. The resistive elements 127 are located in a channel region 132.

The microfluidic channel is formed in the device 100 by an opening 137 in the parylene layer 115. The walls of the opening 137 form a well, and an intermediate layer 120 provides a ceiling thereover. Although a generally rectangular opening 137 is shown in the figure, this is by no means essential; the opening may be any suitable shape. For example, as described below, the opening may flare out toward each end. The height of the walls of opening 137—i.e., the thickness of parylene layer 115—is typically 20 µm. In some embodiments, the thickness of the dielectric layer 118 is in the range 10 µm to 100 µm. A typical channel length is 150 µm. In some embodiments, the channel length is in the range 50 µm and 1 mm. The dielectric layer 118 electrically isolates portions of resistor elements 127 not within the opening from fluids; accordingly, the integrity of dielectric layer 118 is crucial in a drug pump as drug solvent, biological buffers and bodily fluids are all highly ionic and thus electrically conducting. Suitable materials for dielectric layer 118 include silicon carbide, silicon nitride, silicon dioxide, silicon carbonitride, and silicon carboxide. The layer 118 may be a multi-layer dielectric structure consisting of two or more layers of any of the foregoing materials.

The intermediate layer 120 is typically planar and shaped to conform to (and align with) the cover 125 and/or underlying elements, i.e., the dielectric layer 118 and/or the substrate 110. A jig and corresponding alignment notches or holes may be incorporated into intermediate layer 120 for alignment purposes. Intermediate layer 120 and cover 125 may be made of any a variety biocompatible materials, such as parylene and/or silicone.

The intermediate layer 120 and cover 125, when joined, may form a flow restrictor fluidically connected to the channel 132. Layer 120 includes at least two apertures $140_1$, $140_2$ therethrough. These apertures are spaced apart so that, when intermediate layer 120 is joined to parylene layer 115, each aperture overlies a portion of the opening 137 at opposite ends thereof; in some embodiments, the apertures are spaced apart so as to nearly span the channel 132. The diameter of the apertures relative to the channel size, as well as the thickness of the intermediate layer 120, determines the degree of flow restriction. The apertures 140 may, in some embodiments, be numerous, reducing flow restriction but creating, in effect, a porous membrane to act as a filter to prevent large particles or aggregates of the incoming fluid from entering the microfluidic flow channel. This reduces unwanted buildup on the flow sensor and on fluidically downstream components such as a check valve, delaying or mitigating problems such as sensor drift and compromised valve functionality.

Figure 3:
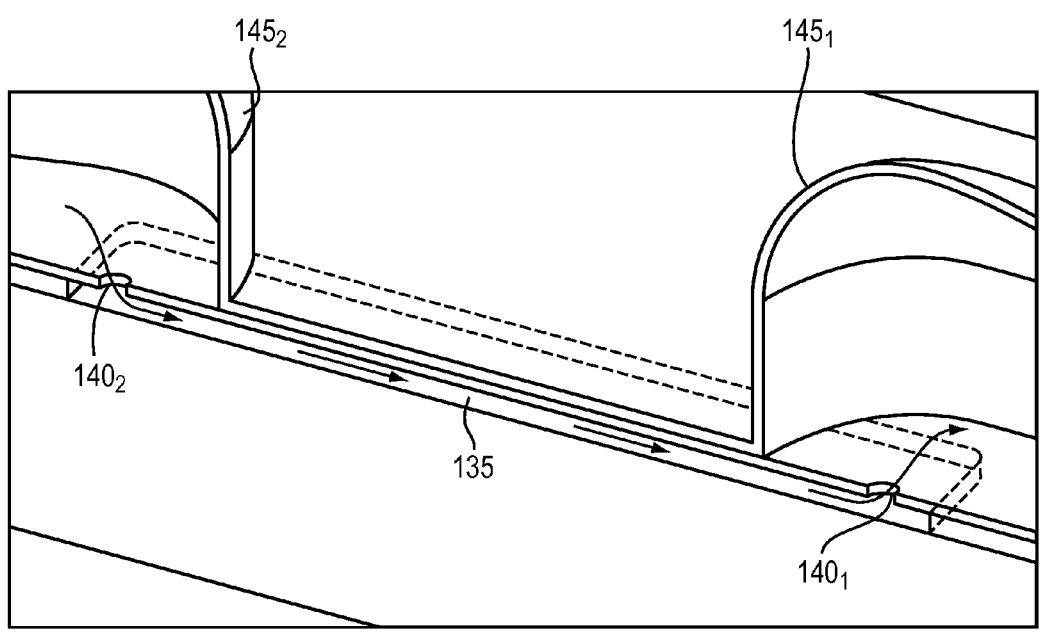
FIG. 3 is a close-up, cut-away view of the fluid path of the embodiment shown in FIGS. 1A and 1B.

As shown in FIG. 3, the apertures 140 each underlie a pocket or receptacle $145_1$, $145_2$ formed in the cover 125. The pockets 145 securely receive cannulas or other tubing in a fluid path so that, in operation, fluid flows from an inlet cannula through aperture $140_1$ into the fluid channel 134, across circuitry 135, and out of aperture $140_2$ to be received by the outlet cannula received within the pocket $145_2$. For reasons discussed below in connection with fabrication, the embodiment illustrated in FIGS. 1A-1C may be made of parylene, while the embodiment shown in FIG. 1D, described in greater detail below, may be made of silicone.

Not shown in detail in FIGS. 1A-1D is sensor circuitry 135, which is electrically connected to the contact pads 130 and located fluidically upstream or downstream of the resistive elements 127 and ultimately to control circuitry for determining a flow rate from signals from the sensor circuitry. Suitable sensor and flow circuits are well-known in the art and are described, for example, in U.S. Ser. No. 12/463,265, filed on May 8, 2009, the entire disclosure of which is hereby incorporated by reference. The flow sensor may be, for example, a time-of flight sensor incorporating any suitable sensor types such as, for example, a temperature sensor, an electrochemical pulse sensor and/or a pressure sensor.

In one embodiment, the sensor 135 is a thermal flow sensor. A thermal flow sensor in accordance herewith may include a single sensor element physically associated with the fluidic channel that functions both as a heater and as a temperature sensor. Alternatively, the thermal flow sensor may include both a heater and a plurality of independent temperature sensor elements that are physically associated with the fluidic channel. Any of numerous configurations that alter the orientation (upstream and downstream placement) of the heaters and temperature sensors within the fluidic channel may be employed. Additionally, according to the different configurations, the measurement parameters may differ. For example, multiple sensors allow for additional nuances including differential temperature measurement and directional fluid flow measurement. Such variations allow for better sensitivity and possible compensation for ambient temperature fluctuations that may affect select regions of the microfluidic channel differently.

In various embodiments, suitable control circuitry (not shown) causes a discrete pulse of power to be applied to the heater, which creates a heat pulse to be measured by one or more sensor elements. The heat pulse travels to the sensor elements by diffusion, which is independent of flow rate, and convection, which depends upon the flow rate. The heat pulse increases the resistance of each sensor proportionally to the local heating, which can be detected by the control circuitry. One circuitry option is to wire the sensors into separate arms of a Wheatstone bridge powered with a constant voltage; the outputs of the bridge connect to a differential amplifier to generate a signal proportional to the volumetric flow rate through the microfluidic channel over the sensor.

Exemplary sensor configurations are illustrated in FIGS. 2A-2D. With reference to FIG. 2A, a thermal flow sensor includes one heater (H) and a single temperature sensor TS1 positioned downstream of the heater. In this embodiment, the control circuitry applies power to the upstream heater in order to heat fluid flowing past the heater, and the temperature sensed by the downstream temperature sensor increases with increasingly higher forward flow rates. More specifically, with increasingly higher forward flow rates for the fluid flowing in the channel 132, the heated fluid has less time to dissipate the heat before reaching the downstream temperature sensor. Again, while not shown, another temperature sensor outside the fluid channel 132 may be used by the control circuitry to compensate for ambient temperature fluctuations.

The configuration shown in FIG. 2B utilizes a single heater H, a first temperature sensor TS1 positioned downstream of the heater, and a second temperature sensor TS2 positioned upstream of the heater. Once again, the control circuitry applies power to the heater. The use of two temperature sensors allows for directional flow sensing. For example, with a forward flow (i.e., flow in the direction of the flow arrow in FIG. 2B), the temperature measured by the downstream temperature sensor TS1 will increase while the temperature measured by the upstream temperature sensor TS2 will decrease. The opposite is true for a reverse flow (i.e., flow in the direction opposite to that of the flow arrow). In addition, while not shown, another temperature sensor outside the fluid channel 132 may also be used by the control circuitry to compensate for ambient temperature fluctuations.

In another approach, a time-of-flight flow sensor generates a tracer pulse in the fluid flowing within the channel 132, and then measures the time that it takes for this pulse to traverse a certain distance. This measured time is defined as the "time of flight" and corresponds to the linear fluid velocity, which may be translated into a volumetric flow rate. The embodiment illustrated in FIG. 2C uses a pulse of heated liquid as the tracer. The magnitude of the time of flight depends upon the spacing of the heaters and temperature sensors, as well as the dimensions of the fluidic channel 132. In the embodiment shown in FIG. 2D, an electrochemical pulse is employed as the tracer. In this embodiment, a pair of electrodes may be used to detect the electrochemical pulse.

With reference to FIG. 2C, a time-of-flight flow sensor includes a single heater H and two or more temperature sensors TS1, TS2 positioned downstream of the heater. Again, the control circuitry may apply a discrete pulse of power to the heater. As the resulting thermal pulse of fluid travels downstream in the direction of the flow arrow, it is initially detected by the first temperature sensor TS1 and then by the second TS2. Each of the delay times between the generation of the pulse of power and the detection of the resulting heated fluid pulse by the respective downstream temperature sensor can be used as an indication of the flow rate. In addition, a delay time between the thermal pulse passing the first temperature sensor and then passing the second temperature sensor can also be used to determine the flow rate. Also, the use of multiple downstream temperature sensors allows the flow sensor's range to be extended, as the temperature sensors closer to the heater are more suited for slower flow rates (as the heat pulse may dissipate from the fluid before reaching the further downstream sensors), while the temperature sensors further downstream are better suited for faster flow rates (as the heat pulse will likely still be present in the fluid when it reaches those further downstream sensors).

In the configuration shown in FIG. 2D, the time-of-flight flow sensor includes upstream electrodes E1, E2 and two downstream electrodes E3, E4. Each of the electrodes may be in contact with the fluid flowing in the channel 132. In this embodiment, the control circuitry may create an electrochemical pulse in the fluid using the two upstream electrodes E1, E2. More specifically, a discrete voltage pulse may be applied across the upstream electrodes E1, E2 to electrochemically change the fluid in proximity to these electrodes. Generally, these electrochemical changes are small changes in the ion concentration or pH of the fluid. The electrochemical pulse may then travel downstream with the fluid flow and be detected by the two downstream electrodes E3, E4. In particular, the control circuitry may measure the impedance across the downstream electrodes. In one embodiment, to prevent electrolysis, an AC impedance measurement is used. A change in impedance signals the presence of the electrochemical pulse. The delay between the time of pulse generation and the downstream detection of the electrochemical pulse is the time of flight. Again, as the flow rate increases, the time of flight decreases.

2. Fabrication

Current fabrication techniques at scales relevant to embodiments of the present invention are typically performed on a wafer level in successive fabrication steps, which can take substantial time. Embodiments hereof utilize only two major steps that can be accomplished efficiently. The first step is fabrication of the planar wafer to create the substrate 110. The second step is channel fabrication that creates the channel walls and top. This segmented fabrication process imparts flexibility and efficiency to overall assembly. Additionally, it removes potential manufacturing bottlenecks and facilitates the use of interchangeable components (e.g., a substrate with integrated functional components such as a flow sensor, pressure sensor, check valve, filters, etc.). The resulting assembly-line modularity and ease of altering the angles, shape and height of the microfluidic channels contributes to efficient, flexible manufacture and lower associated costs.

As explained above, the flow sensor is a planar structure fabricated on an electrically and thermally insulating substrate 110, such as glass or fused silica. Resistor elements 127 may be made of metal, such as platinum with a titanium adhesion layer. Wires connecting the resistor elements 127 to contact pads 130 may include a thick layer of a more conductive metal, such as gold. These metals can be deposited by evaporation—e.g., thermal or electron beam—or by sputtering techniques. The metals can be patterned by lift-off or etching techniques.

Selection of materials and planar wafer configuration is important to create a flow sensor capable of implanted use. Fused silica is particularly preferred as a substrate material due to the high purity, high strength, and low thermal conductivity that helps insulate the channel from fluctuations in ambient temperature that may effect operation of the flow sensor. Comparatively, a conventional silicon substrate would likely be too fragile to create a low-profile flow sensor capable of the in vivo uses contemplated herein. Amorphous silicon carbide is a good dielectric material due to its high thermal conductivity, high strength, durability and chemical inertness. A chemically inert fluid channel may be critical in implantable drug pumps because the pump should not alter the pharmacological properties of the dispensed drug. Conventional methods of improving material resistance, such as depositing a layer to protect against corrosion, likely will not suffice for implanted uses as deposited material layers have a tendency to delaminate over long periods of time, mixing with the pharmacological medium and possibly clogging downstream structures such as check valves. Similarly, creating a free-standing structure or an insulating cavity would increase the fragility of the flow sensor as well as the height of the flow sensor, thereby making it less desirable for long term implantation.

A small flow channel minimizes the footprint of the sensor, reduces flow sensor power consumption as it minimizes heater and sensor sizes, and reduces the dead space in which pharmacological fluid remains trapped (which may be weeks or months between doses and months or years between refill of the main drug reservoir upstream of the sensor), thereby minimizing the volume of possible contamination from the target physical location to which drug is delivered.

As noted, the channel can have any desired shape, angles, and size, and this can quickly be altered by changing the mold for the intermediate layer. This modularity allows the fabricated microfluidic flow sensor to be easily integrated into a variety of MEMS devices of different configurations. Below are descriptive examples of two commonly used fabrication materials and manufacturing steps tailored to this modular process. Those skilled in the art will recognize that other materials, and material-specific processes known in the field, may be alternatively employed. Furthermore, as the channel is molded to specific shapes that are less than the size of the whole sensor die, the bond pads and electrical connections are well insulated from the fluid path, facilitating simpler integration into the implantable medical device. U.S. Ser. No. 61/821,039, filed on May 8, 2013, the entire disclosure of which is hereby incorporated by reference, discusses various methods of manufacturing tubing to follow a desired path and to fit within the inlet and outlet pockets of the sensor.

Figure 1D:
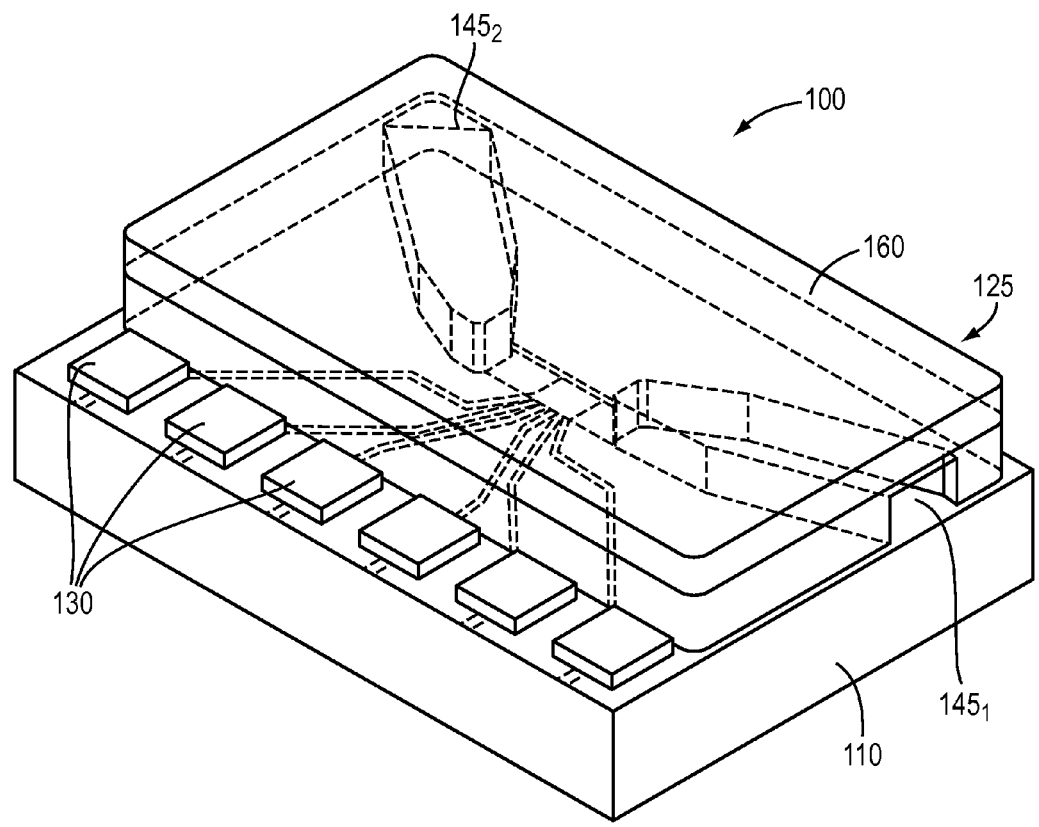
FIG. 1D is a perspective view of a flow-sensor embodiment that may be fabricated from, for example, a silicon carbide substrate with pockets formed in a material such as silicone.

With reference to FIG. 1D, the cover 125 illustrated in FIGS. 1A-1C can be fabricated from silicone that is cast over a mold to form a bulk structure. The pockets 145 are formed within the block of molded silicone, which is cured, removed from the mold and optionally treated with one or more solvents (such as heptane, hexane, xylene, ethyl ether, acetone, or isopropanol) to remove any uncured silicone from the structure. It may be useful or necessary to use the expansionary effects of any one of those solvents to remove the cured silicone from the mold. In this embodiment, the parylene and intermediate layers 115, 120 may be omitted in that the walls (i.e., the vertical dimension) of the channel may be defined by a recess within the body of silicone cover 125 between the pockets 145.

Silicone channel structures are covalently bonded to silicon-containing dielectric layers—such as silicon carbide, silicone nitride or silicone dioxide, silicon carbonitride or silicon carboxide, or a multi-layer dielectric structure made from two or more of these materials—by exposing both the dielectric and silicone surfaces to an oxygen plasma, which leaves many silanol groups on both surfaces, and then bringing the surfaces into contact. The surfaces bond in a reaction that creates Silicone-Si—O—O—Si-Dielectric and Silicone-Si—O—Si-Dielectric bonds with water as a byproduct. The bonding process can be accelerated and strengthened by baking the pieces after bringing them into contact at a moderate temperature (e.g., 60-100° C.) for a few hours (e.g., 2-24 hours). It may be advantageous to reinforce the silicone channel with a rigid top layer 160, as illustrated in FIG. 1D, to reduce and prevent deformation of the silicone channel under pressure. This may be achieved by bonding, with oxygen plasma, a thin glass or fused silica piece 160 to the top of the molded silicone block. Inlet and outlet tubes are inserted into the openings 145 in the silicone block and may be sealed with uncured silicone and baked to cure the silicone, thereby providing fluidic isolation. In order to strengthen the bond of the tube-sealing silicone to the underlying dielectric on the flow-sensor substrate 110, an octenyl-containing compound can be applied before inserting and sealing the tubes. For example 7-octenyldimethylchlorosilane, 7-octenyltrichlorosilane or 7-octenyltrimethoxysilane can be vapor-deposited on the dielectric.

Returning to the embodiment illustrated in FIGS. 1A-1C, a parylene cover 120 is more rigid, inert and impermeable to gas and liquid than silicone; it cannot, however, be bonded to the dielectric layer 115 with the same oxygen plasma technique. Instead, parylene may be anchored to the substrate with mechanical anchors that are augmented with a methacryloxy-containing adhesion promoter using, for example, the method described in Liger et al., "Robust parylene-to-silicone mechanical anchoring," *Proceedings of the IEEE Sixteenth Annual International Conference on Micro Electro Mechanical Systems* (2003) (the entire disclosure of which is hereby incorporated by reference).

Figure 4:
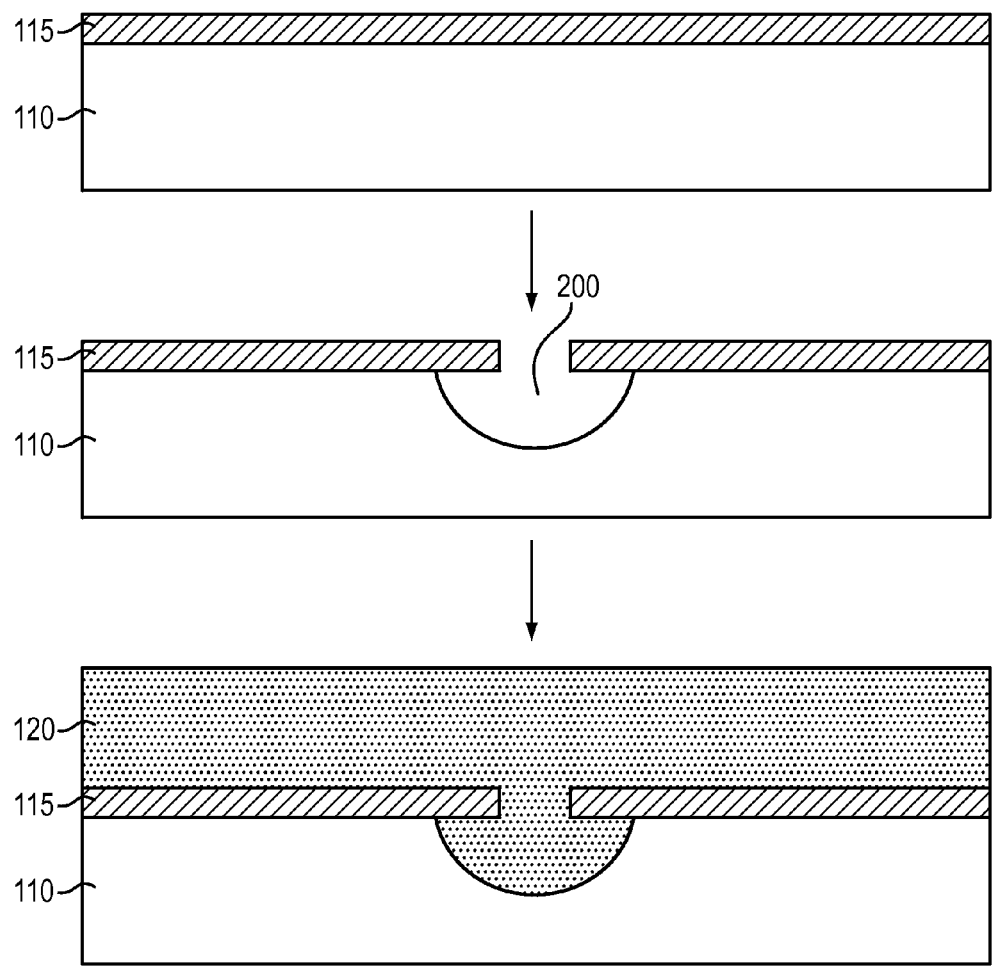
FIG. 4 illustrates creation of mechanical anchorage structures in an embodiment of the invention.

As shown in FIG. 4, suitable anchors may be fabricated by first etching an opening 200 in the dielectric layer 118 to expose the substrate 110, then selectively and isotropically etching the substrate 110 but not the dielectric to open a cavity beneath the dielectric layer 118. When using a silicon carbide dielectric layer 118 on a fused silica substrate 110, these two etches are performed using a fluorine-based plasma to etch the silicon carbide, followed by a hydrofluoric acid etch to isotropically etch the fused silica. The parylene layer 120 is vapor deposited and thus conformably coats the device surface and fills the cavities 200 beneath the dielectric layer 118 in a continuous layer so as to form mechanical interlocks, preventing removal of the parylene.

A methacryloxy adhesion promoter (e.g., A174) is applied to the surface of the deposited parylene layer 115 and a layer of parylene is deposited across the wafer (20 μm is a typical thickness for the parylene layer that defines the channel walls). The channel is then defined by etching the parylene with an oxygen plasma using a metal etch mask (typically aluminum). After removing the metal etch mask, the intermediate layer 120 and the cover 125 is applied. The cover 125 may be formed by depositing parylene over a mold that includes inlet and outlet pockets 145, etching the deposited parylene in an oxygen plasma with a metal etch mask to define the extent of the cover, and releasing the parylene from the mold. The parylene cover 125 may be bonded to the parylene intermediate layer 120 using an epoxy. Similarly, the inlet and outlet tubes may be bonded to the parylene channel pockets 145 using an epoxy.

To prevent the incursion of adhesive into the pockets, which could interfere with tube connection and fluid flow through the channel, one or more catch-wells may be introduced into the cover 125. These catch-wells are raised, fluidic extensions of the pockets 145 receive excessive adhesive. They can vary in number and height, depending on the expected degree of adhesive incursion, although typically they are much lower in height than the pockets themselves to promote wicking of the adhesive. FIG. 5A shows a configuration with two catch-wells 215 that intrude into the lumen of the pocket 145. This design is useful if the catch-wells are shallow enough to avoid interfering with tube placement within the pocket 145, or if the first catch-well serves the additional purpose of acting as a stop to prevent further tube insertion. The catch-wells 220 shown in FIG. 5B extend away from the pocket 145 and therefore do not interfere with tube placement therein. Additional catch-wells 215 may also serve to catch protein clumps of the drug prior to reaching the channel 137. Again, although two catch-wells are shown in the figures for illustrative purposes, the optimal number is straightforwardly selected by the designer.

Concentrated protein solutions are prone to clumping. When the size of the clumps approaches the minimum channel dimensions in a fluidic system, blockage of the flow channel can occur. Filters placed upstream of constrictions in a channel can sequester clumps of proteins or other particulates above a certain size, determined by the filter's characteristics, and thus prevent blockage of the flow channel.

In one embodiment illustrated in FIG. 6, the flow sensor 100 includes a filter 150 in the flow channel 132. The filter consists of an array of posts or cups having a diameter and spacing selected to catch particles at and above a certain size. For example, four rows of posts of diameter 15 μm and spaced 15 μm apart will filter particles larger than 15 μm while allowing smaller particles and clump-free solution to pass. In some embodiments, the channel 132 may flare outwardly toward the end(s) with filter posts to minimize interference with flow as debris accumulates among the posts.

The filter posts may be molded into the parylene layer 115 case. That is, anchors are created to anchor the filter elements to the substrate. Parylene is vapor deposited. A metal etch mask is deposited and patterned on top of the parylene. The metal etch mask defines both the parylene channel and the filter elements. The filter and channel are defined by etching the parylene in an oxygen plasma.

To capitalize on the modular design, a screening method to detect flaws in the manufacture of the dielectric layer may be implemented. The integrity of the dielectric layer that separates the resistive elements from the liquid is critical to proper flow-sensor operation. Drug solvents, biological buffers and bodily fluids are highly ionic and thus electrically conducting. Electrical connections between the resistive elements through the fluid result in increased noise and drift. More problematic, particularly for long term implants, is that exposure of current-carrying metals to ionic solutions will result in corrosion and etching of the metals over time. This is particularly deleterious in the case of the resistive elements, whose degradation will result in failure of the flow sensor. It is therefore important to screen each flow sensor for pinholes and other defects in the dielectric that could lead to failure.

Figure 7:
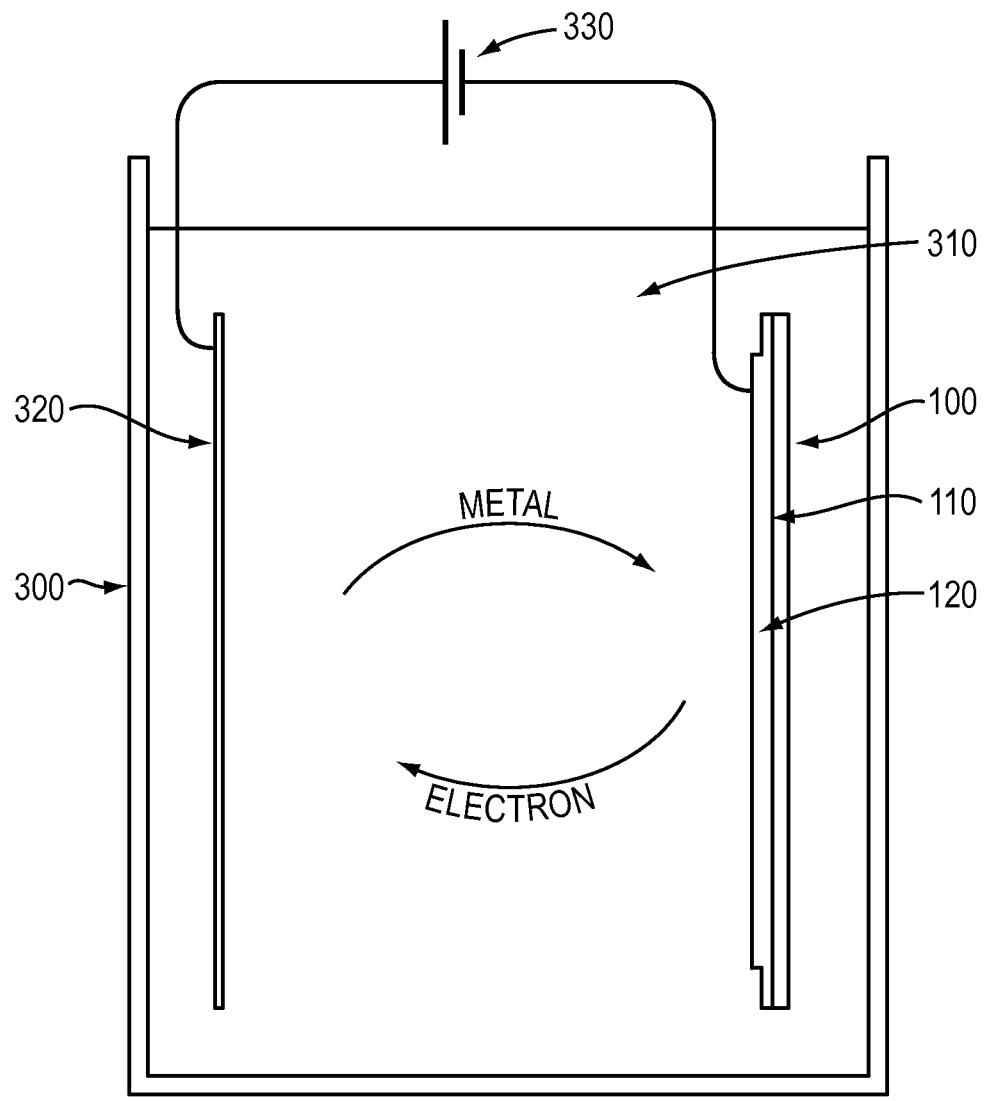
FIG. 7 schematically illustrates a manufacturing technique facilitating defect screening.

FIG. 7 illustrates a screening technique that utilizes an electroplating solution. Electroplating is a process that uses electrical current to reduce dissolved metal cations so that they form a solid metal coating over an electrode. To screen for pinholes using an electroplating solution, an electrochemical cell 300 is utilized. Prior to completion of fabrication, the substrate 110 with circuit elements thereon and the dielectric layer 118 bonded thereto is introduced into an electroplating solution 310 in the cell 300. The flow-sensor resistive elements to be tested serve as the working electrode, and the electroplating solution also contains a counter electrode 320, typically a platinum coated wafer or a mesh of platinum wire. An elevated temperature is frequently used to accelerate the electroplating process. A current or voltage source 330 drives the electrodes. If there are pinholes or weak points in the dielectric over the resistive elements, metal will plate over those defects. Given sufficient time and electrical current, the plated metal over the defect will grow in size until it can be easily observed under an optical microscope. Thus flow sensors with dielectric pinholes or weak spots can be easily identified and discarded.

This screening process can be performed as part of an electroplating step that defines circuit elements, e.g., the contact pads, or can be performed in isolation as a screen step after the circuit elements have been fabricated. The approach has at least two primary benefits. First, if all of the flow sensors in a wafer are connected electrically, then the entire wafer can be screened at once. Second, because the defective devices are effectively labeled with a visible metal spot, they need not be tracked or removed during the pinhole screening process.

Due to the low profile and compact size of flow sensors as described herein, two or more flow sensors may be connected in parallel within an implantable device. This not only allows for an increased total flow rate while maintaining high fluid-flow measurement accuracy, but also creates redundancies in case one or more of the fluid paths becomes clogged by drug aggregate or other materials.

Various embodiments of the invention are described above. It will, however, be apparent to those of ordinary skill in the art that other embodiments incorporating the concepts disclosed herein may be used without departing from the spirit and scope of the invention. Accordingly, the above description is intended to be only illustrative and not restrictive.

What is claimed is:

1. A microfluidic flow sensor comprising:
an electrically and thermally insulating substrate;
deposited on a single surface layer on the substrate, circuit components including (i) at least one sensor element, (ii) at least two resistive elements, different from the at least one sensor element, and (iii) at least two contact pads each electrically connected to one of the resistive elements;
disposed on at least a portion of the circuit components, a dielectric layer; and
disposed on the substrate, a cover defining (i) a well over a channel region of the substrate, (ii) at least two apertures overlying the channel region, and (iii) a pair of receiving pockets each configured for receiving a fluid conduit therein, the receiving pockets (A) being formed in the cover and oriented such that fluid flow therein is parallel to a top surface of the cover and (B) fluidically communicating with the channel region but not directly with each other,
wherein the at least one sensor element is disposed within the channel region on the substrate for contact with fluid flowing through the channel region.

2. The microfluidic flow sensor of claim 1, wherein the cover comprising a single block of silicone.

3. The microfluidic flow sensor of claim 1, wherein the at least two contact pads are fluidically isolated from the channel region.

4. The microfluidic flow sensor of claim 1, wherein each said at least one sensor element is a time-of-flight sensor.

5. The microfluidic flow sensor of claim 1, wherein the cover is parylene, the dielectric layer is amorphous silicon carbide and the substrate is fused silica.

6. The microfluidic flow sensor of claim 2, wherein the dielectric layer is amorphous silicon carbide and the substrate is fused silica.

7. The microfluidic flow sensor of claim 1, further comprising a plurality of spaced-apart posts within the channel region for trapping debris.

8. The microfluidic flow sensor of claim 1, wherein the dielectric layer has a thickness in the range of about 10 μm to about 100 μm and the channel region has a longest dimension in the range of 50 μm to 1 mm.

* * * * *